(12) United States Patent
Hunt et al.

(10) Patent No.: US 12,051,558 B2
(45) Date of Patent: *Jul. 30, 2024

(54) LIQUID METAL BEARING WITH ENHANCED SEALING STRUCTURES

(71) Applicant: GE Precision Healthcare LLC, Wauwatosa, WI (US)

(72) Inventors: Ian Strider Hunt, Sussex, WI (US); Jace Dowd, New Berlin, WI (US); Kyle Russell Berndt, Milwaukee, WI (US); Eric Lubar, Milwaukee, WI (US); Andrew Triscari, Hubertus, WI (US); Ryan Dagen, Sullivan, WI (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,552

(22) Filed: Apr. 26, 2023

(65) Prior Publication Data

US 2023/0343544 A1 Oct. 26, 2023

Related U.S. Application Data

(63) Continuation of application No. 17/245,671, filed on Apr. 30, 2021, now Pat. No. 11,670,475.

(51) Int. Cl.
*H01J 35/10* (2006.01)

(52) U.S. Cl.
CPC ..... *H01J 35/104* (2019.05); *H01J 2235/1053* (2013.01); *H01J 2235/1066* (2013.01); *H01J 2235/1086* (2013.01)

(58) Field of Classification Search
CPC ............. H01J 35/104; H01J 2235/1053; H01J 2235/1066; H01J 2235/1086
See application file for complete search history.

(56) References Cited

U.S. PATENT DOCUMENTS 9,500,226 B2  11/2016  Hunt
11,670,475 B2 *  6/2023  Hunt .............. H01J 35/104
378/133

(Continued)

FOREIGN PATENT DOCUMENTS

DE  19614334 C1  12/1997
DE  102015215306 B4  8/2018

(Continued)

OTHER PUBLICATIONS

CN 1060556 A with English translation. (Year: 1992).*

(Continued)

*Primary Examiner* — Chih-Cheng Kao

(57) ABSTRACT

A bearing structure for an X-ray tube is provided that includes a journal bearing shaft with a radially protruding thrust bearing encased within a sleeve. The structure of sleeve is formed with enlarged traps or voids in the sleeve that are disposed adjacent various rotating anti-wetting seals/seal surfaces formed between the sleeve and the shaft. The geometry of the traps is formed to retain liquid metal/lubricating fluid within the gap defined by the bearing assembly and to direct to liquid metal flowing outwardly from the gap defined between the sleeve and the shaft away from the rotating anti-wetting seals and back towards the gap. This geometry allows the centrifugal forces exerted on the liquid metal by the rotation of the bearing structure to move the outflowing liquid metal away from the rotating anti-wetting seals to significantly reduce contact of the liquid metal with the seals.

20 Claims, 11 Drawing Sheets

(56) References Cited

U.S. PATENT DOCUMENTS

2016/0133431 A1   5/2016  Hunt
2020/0294753 A1   9/2020  Hunt
2021/0082654 A1   3/2021  Heuermann

FOREIGN PATENT DOCUMENTS

JP      04144046 A    5/1992
JP      4247978 B2    4/2009

OTHER PUBLICATIONS

DE102015215306 English Abstract, Espacenet, May 16, 2023; 1 page.
DE19614334—English Abstract, Espacenet, May 16, 2023; 1 page.
European application 22169530.7 filed Apr. 22, 2022—extended Search Report issued Feb. 23, 2023; 14 pages.
JP4247978—English Abstract of application JP2005108511A, Espacenet, May 16, 2023; 1 page.
JPH04144046—English Abstract, European Patent Office; 1 page.

\* cited by examiner

LIQUID METAL BEARING WITH ENHANCED SEALING STRUCTURES

CROSS-REFERENCE TO RELATED APPLICATIONS

This application is a continuation of U.S. application Ser. No. 17/245,671, filed on Apr. 30, 2021, the disclosure of which is incorporated herein by reference in its entirety.

BACKGROUND OF THE INVENTION

The invention relates generally to X-ray tubes and, more particularly, to structures and methods of assembly for the bearing utilized in an X-ray tube.

X-ray systems, including computed tomography (CT) imaging systems, may include an X-ray tube, a detector, and a support structure for the X-ray tube and the detector. In operation, an imaging table, on which an object is positioned, may be located between the X-ray tube and the detector. The X-ray tube typically emits radiation, such as X-rays, toward the object. The radiation passes through the object on the imaging table and impinges on the detector. As radiation passes through the object, internal structures of the object cause spatial variances in the radiation received at the detector. The detector then generates data, and the system translates the data into an image, which may be used to evaluate the internal structures of the object. The object may include, but is not limited to, a patient in a medical imaging procedure or an inanimate object as in, for instance, a package.

X-ray tubes include a cathode and an anode located within a high-vacuum environment. In many configurations, the anode structure is supported by a liquid metal bearing structure, e.g., a herringbone groove or spiral groove bearing (SGB) structure, also known as a hydrodynamic bearing, formed with a shaft disposed within a sleeve to which the anode target is attached and rotates around the shaft. The spiral groove bearing structure also includes grooves, such as spiral or helical grooves, on various surfaces of the shaft and/or the sleeve that serve to take up the radial and axial forces acting on the sleeve as it rotates around the shaft.

Typically, an induction motor is employed to rotate the anode, the induction motor having a cylindrical rotor built into an axle formed at least partially of the sleeve that supports the anode target and a stator with copper windings that surrounds an elongated neck of the X-ray tube. The rotor of the rotating anode assembly is driven by the stator. The X-ray tube cathode provides a focused electron beam that is accelerated across a cathode-to-anode vacuum gap and produces X-rays upon impact with the anode target. Because of the high temperatures generated when the electron beam strikes the target, it is necessary to rotate the anode assembly at a high rotational speed. This places stringent demands on the bearings and the material forming the anode structure, i.e., the anode target and the shaft supporting the target.

Advantages of liquid metal bearings, such as spiral groove bearings, in X-ray tubes include a high load capability and a high heat transfer capability due to an increased amount of contact area. Other advantages include low acoustic noise operation, as is commonly understood in the art. Gallium, indium, or tin alloys, among others, are typically used as the liquid metal in the bearing structure, as they tend to be liquid at room temperature and have adequately low vapor pressure at operating temperatures, to meet the rigorous high vacuum requirements of an X-ray tube.

To retain the liquid metal/lubricating fluid within the bearing structure, the components of the bearing structure are formed with a number of structural features that operate to minimize the leakage of the liquid metal/lubricating fluid through open ends of the bearing structure. As shown in FIGS. 1A and 1B, the sleeve seal/portion 1000 and thrust seal 1002 for a prior art bearing structure include a number of traps 1004 and corresponding seals 1005 formed therein that operate as restrictions to the passage of the liquid metal/lubricating fluid past the traps 1004 and seals 1005. The traps 1004 and seals 1005 are spaced from one another to provide redundant obstructions for the flow of the liquid metal past the traps 1004 and seals 1005 and out of the bearing structure. Further, some of the traps 1004 are formed with channels 1006 that direct the liquid metal entering the trap 1004 back into the bearing structure. In addition to the traps 1004 and seals 1005, the shaft 1008 can be formed with radial undercuts 1010 adjacent the traps 1004 that are intended to limit the amount of liquid metal/lubricating fluid flowing past the undercuts 1010 and reaching the traps 1004 and seals 1005.

Due to the high surface tension of the liquid metal utilized in the bearings, the adherence of the liquid metal to the bearing surfaces creates a high-pressure seal, i.e., up to 20 psi, between the liquid metal and the bearing components, such as across the seals 1005 formed by the gap between the shaft 1008 and the sleeve 1000 and between the shaft 1008 and the thrust seal 1002, to retain the liquid metal within the bearing.

However, even with these structures for the journal bearing components, leaks often occur due to the highly wetting nature of the liquid metal and oxidized forms thereof, e.g., gallium oxide, with regard to the surfaces of the bearing structure. In particular, the gallium forming the liquid metal is oxidized at room temperature during bearing processing into gallium oxide, which can form a coating on the exterior of the volume of gallium within the bearing structure. Gallium oxide has a highly wetting nature and can adhere to the surfaces of the rotating seals 1005 that are constructed to function as anti-wetting capillary seals. The adherence of the gallium oxide to the rotating bearing surfaces causes the anti-wetting seals 1005 formed by the surfaces to become wetting capillary seals. Wetting capillary seals are less effective as a seal for a liquid metal, i.e., gallium, because wetting seals suck in a liquid to create the seal, making it easier for the liquid to leak out through the seal 1005, particularly when disposed between rotating components.

In addition, due to the presence of the liquid within and forming the seal 1005, wetting capillary seals form barriers for gases trapped within the journal bearing structure. Thus, the wetting capillary seals retain gases within the bearing structure and allow the gases to build pressure behind the seal. When the gas pressure behind the seal 1005 exceeds a maximum for the wetting capillary seal, the gas expands through the wetting capillary seal causing the seal to suddenly fail, allowing the liquid metal to flow out through the seal.

Also, the structures used in the formation of the anti-wetting seals 1005 can enable amounts of the liquid metal to pool at the location of the anti-wetting seal. When the volume of the pooled liquid metal covers or blocks the seal 1005, such as when the adjacent trap 1004 is filled with the liquid metal, the liquid metal can also retain trapped gases, allowing the pressure of the gases to build up behind the pooled liquid metal. Ultimately, in the same manner as described above, the pressure of the trapped gases can force the pooled liquid metal to leak through the anti-wetting seal 1005.

Therefore, it is desirable to develop a bearing structure and method for the formation and operation of a bearing structure for an X-ray tube to significantly minimize the detrimental effects of oxidized liquid metal and/or trapped gas(es) on the anti-wetting seals formed in the bearing structure of the X-ray tube.

BRIEF DESCRIPTION OF THE DISCLOSURE

In the present disclosure a liquid metal or spiral groove bearing structure for an X-ray tube and associated process for manufacturing a bearing structure comprised of a shaft having a journal bearing and a radially protruding thrust bearing encased within a bearing housing or sleeve. The sleeve includes a thrust seal that is engaged with the sleeve around the thrust bearing in a manner to maintain coaxiality for the rotating liquid metal seal formed within the sleeve about the journal bearing shaft. The engagement of the thrust seal with the sleeve around the thrust bearing on the journal bearing shaft enables the liquid metal to be retained between the journal bearing shaft and the sleeve to enable free rotation of the sleeve around the journal bearing shaft during operation of the X-ray tube.

The structure of sleeve and the thrust seal are formed with enlarged traps or voids in the sleeve and thrust bearing that are disposed adjacent various rotating anti-wetting seals/seal surfaces formed between the sleeve or the thrust bearing and the shaft. The geometry of the traps is formed to retain liquid metal/lubricating fluid within the gap defined by the bearing assembly and to direct to liquid metal flowing outwardly from the gap defined between the sleeve/thrust bearing and the shaft away from the rotating anti-wetting seals. This geometry allows the centrifugal forces exerted on the liquid metal by the rotation of the bearing structure to move the outflowing liquid metal away from the rotating anti-wetting seals to significantly reduce contact of the liquid metal with the seals.

Further, the geometry of the enlarged traps is designed to minimize the effects of outflowing liquid metal on the operation of the anti-wetting seals in any orientation for the bearing structure by increasing the amount of liquid metal that can be accommodated within the traps prior to the liquid metal covering the rotating anti-wetting seals/seal surfaces, and thereby trapping gases within the bearing structure. This consequently significantly reduces the corresponding static pressure exerted by the liquid metal on the seals, and the dynamic pressure exerted by trapped gases pressing the liquid metal against the seals, allowing the anti-wetting seals to maintain the liquid metal within the bearing structure while enabling gases to escape through the seals.

In addition, the ability of the anti-wetting seals to retain the liquid metal within the bearing structure is enhanced by the use of texturing of surfaces on the sleeve and/or thrust bearing. The texturing of the surfaces is done to significantly reduce the surface areas of the sleeve and thrust bearing surfaces disposed on and/or adjacent the anti-wetting seals that is able to be contacted by the liquid metal. This reduced surface area greatly reduces the ability of the liquid metal to adhere to and spread on the textured surfaces, such that the textured surfaces are highly anti-wetting to the liquid metal.

Also, the sleeve, thrust bearing and the shaft can be formed with fluid pinning features that inhibit the flow of outflowing liquid metal. The features interact with the outflowing liquid metal to create surface tension forces on the outflowing liquid metal to restrict the flow of the liquid metal in directions away from the anti-wetting seals, thereby improving the maintenance and effectiveness of the anti-wetting seals.

In one exemplary embodiment of the invention, a bearing assembly for an X-ray tube including a shaft, a sleeve disposed around the shaft, wherein one of the shaft and the sleeve is rotatable with regard to the other to form a rotating component and a stationary component, a lubricating fluid disposed between the shaft and the sleeve within a gap disposed between the sleeve and the shaft and at least one fluid trap formed in the sleeve, the at least one fluid trap having a proximal end in fluid communication with the gap, a distal end spaced from the gap and disposed adjacent a rotating seal formed between the sleeve and the shaft, and a sloped surface extending between the distal end and the proximal end.

In another exemplary embodiment of the invention, an X-ray tube includes a cathode assembly, and an anode assembly spaced from the cathode assembly, wherein the anode assembly includes a shaft, a sleeve disposed on the shaft, wherein one of the shaft and the sleeve is rotatable with regard to the other to form a rotating component and a stationary component, a lubricating fluid disposed between the shaft and the sleeve within a gap disposed between the sleeve and the shaft and at least one fluid trap formed in the sleeve, the at least one fluid trap having a proximal end in fluid communication with the gap, a distal end spaced from the gap and disposed adjacent a rotating seal formed between the sleeve and the shaft, and a sloped surface extending between the distal end and the proximal end.

In still another exemplary embodiment of the method of the invention, method for minimizing leakage of a lubricating fluid out of a bearing assembly during use in an operating X-ray tube including the steps of providing a bearing assembly including a shaft, a sleeve disposed on the shaft, wherein one of the shaft and the sleeve is rotatable with regard to the other to form a rotating component and a stationary component, a lubricating fluid disposed between the shaft and the sleeve within a gap disposed between the sleeve and the shaft and at least one fluid trap formed in the sleeve, the at least one fluid trap having a proximal end in fluid communication with the bearing gap, a distal end spaced from the gap and disposed adjacent a rotating seal formed between the sleeve and the shaft, and a sloped surface extending between the distal end and the proximal end, operating the X-ray tube to rotate the rotating component relative to the stationary component and directing lubricating fluid exiting the bearing gap into the trap for redirection into the bearing gap.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
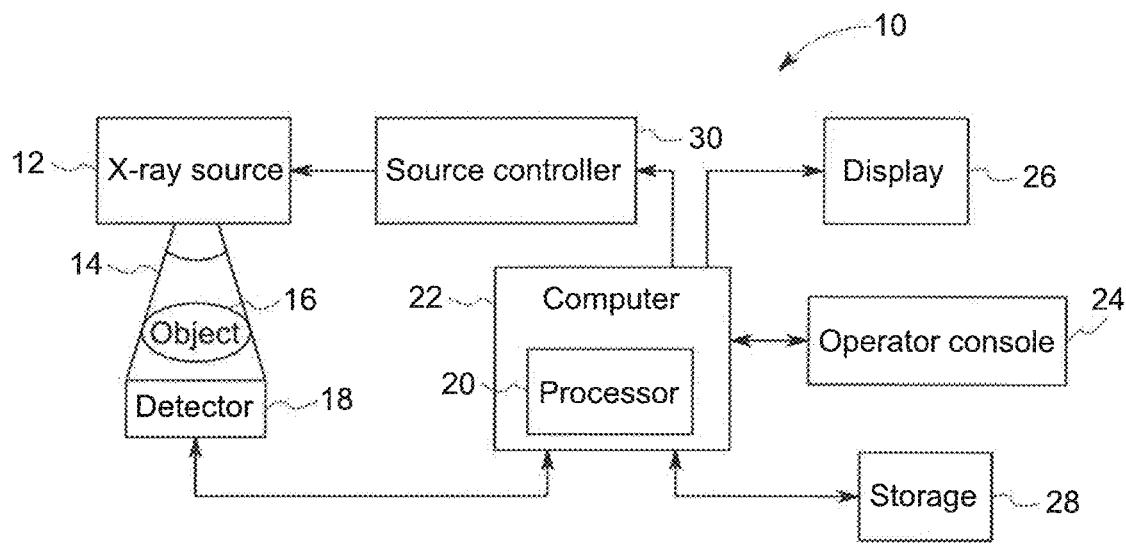
FIG. 2 is a block diagram of an imaging system incorporating exemplary embodiments of the disclosure.

FIG. 2 is a block diagram of an embodiment of an imaging system 10 designed both to acquire original image data and to process the image data for display and/or analysis in accordance with embodiments of the invention. It will be appreciated by those skilled in the art that various embodiments of the invention are applicable to numerous medical imaging systems implementing an X-ray tube, such as X-ray imaging systems or fluoroscopic imaging systems. Other imaging systems such as computed tomography (CT) imaging systems and digital radiography (RAD) imaging systems, which acquire image three-dimensional data for a volume, also benefit from the invention. The following discussion of X-ray imaging system 10 is merely an example of one such implementation and is not intended to be limiting in terms of modality.

As shown in FIG. 2, imaging system 10 includes an X-ray tube or X-ray source 12 configured to project a beam of X-rays 14 through an object 16. Object 16 may include a human subject, pieces of baggage, or other objects desired to be scanned. X-ray source 12 may be conventional X-ray tubes producing X-rays 14 having a spectrum of energies that range, typically, from thirty (30) keV to two hundred (200) keV. The X-rays 14 pass through object 16 and, after being attenuated, impinge upon a detector assembly 18. Each detector module in detector assembly 18 produces electrical signals that represents the intensity of an impinging X-ray beam, and hence the attenuated beam, as it passes through the object 16. In one embodiment, detector assembly 18 is a scintillator based detector assembly, however, it is also envisioned that direct-conversion type detectors (e.g., CZT detectors, photon-counting detectors, etc.) may also be implemented.

A processor 20 receives the signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the X-ray system 10 and view the reconstructed image or other data from computer 22 on a display unit 26. Additionally, console 24 allows an operator to store the generated image in a storage device 28 which may include hard drives, floppy discs, compact discs, etc. The operator may also use console 24 to provide commands and instructions to computer 22 for controlling an X-ray source controller 30 that provides power and timing signals to X-ray source 12.

Figure 3:
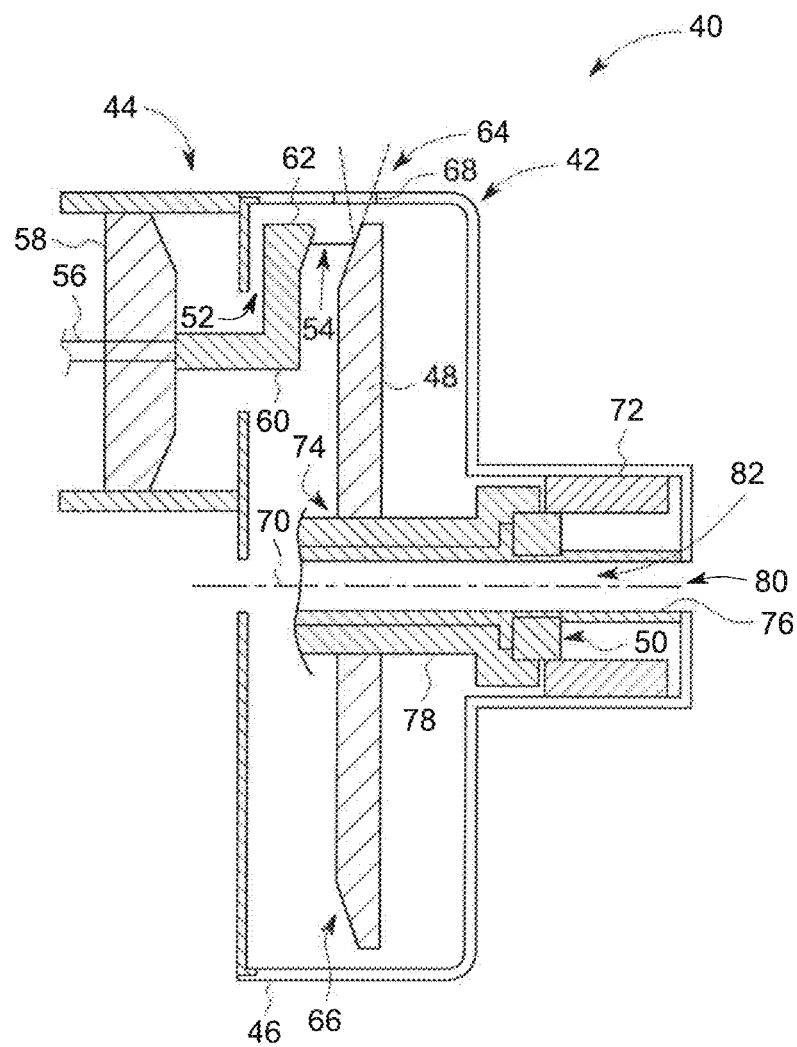
FIG. 3 is a cross-sectional view of a portion of an X-ray tube according to an exemplary embodiment of the disclosure and usable with the system illustrated in FIG. 2.

FIG. 3 illustrates a cross-sectional view of an X-ray source 12 incorporating embodiments of the invention. In the illustrated embodiment, X-ray source 12 is an X-ray tube 40 that includes an anode assembly 42 and a cathode assembly 44. The anode and cathode assemblies 42, 44 are supported within an insert or frame 46, which houses a target or anode 48, a bearing assembly 50, and a cathode 52. Frame 46 defines an area of relatively low pressure (e.g., a vacuum) compared to ambient, in which high voltages may be present. Frame 46 may be positioned within a casing (not shown) filled with a cooling medium, such as oil, that may also provide high voltage insulation. While the target and anode are described above as being a common component of X-ray tube 40, the target and anode may be separate components in alternative X-ray tube embodiments.

In operation, an electron beam 54 is produced by cathode assembly 44. In particular, cathode 52 receives one or more electrical signals via a plurality of electrical leads 56. The electrical signals may include power and timing/control signals that cause cathode 52 to emit electron beam 54 at one or more energies and at one or more frequencies. The electrical signals may also at least partially control the potential between cathode 52 and anode 48. Cathode 52 includes an insulator 58 from which an arm 60 extends. Arm 60 encloses electrical leads 56, which extend into a cathode cup 62 mounted at the end of arm 60. In some embodiments, cathode cup 62 includes focusing elements that focuses electrons emitted from a filament within cathode cup 62 to form electron beam 54.

X-rays 64 are produced when high-speed electrons of electron beam 54 from cathode 52 are suddenly decelerated upon impacting a target surface 66 formed on anode target 48. The high-speed electrons forming electron beam 54 are accelerated toward the anode target 48 via a potential difference therebetween of, for example, sixty (60) thousand volts or more in the case of CT applications. The X-rays 64 are emitted through a radiation emission window 68 formed in frame 46 that is positioned toward a detector array, such as detector 18 of FIG. 1.

Anode assembly 42 includes a rotor 72 and a stator (not shown) located outside X-ray source 40 and partially surrounding rotor 72 for causing rotation of anode target 48 during operation. Anode target 48 is supported in rotation by a bearing assembly 50, which, when rotated, also causes anode target 48 to rotate about a centerline 70. As shown, anode target 48 has a generally annular shape, such as a disk, and an annular opening 74 in the center thereof for receiving bearing assembly 50.

Target 48 may be manufactured to include a number of metals or composites, such as tungsten, molybdenum, or any material that contributes to Bremsstrahlung (i.e., deceleration radiation) when bombarded with electrons. Target surface 66 of anode target 48 may be selected to have a relatively high refractory value so as to withstand the heat generated by electrons impacting target surface 66. Further, the space within insert or frame 46 and between cathode assembly 44 and anode assembly 42 is at vacuum pressure in order to minimize electron collisions with other atoms and to maximize an electric potential.

To avoid overheating of the target 48 when bombarded by the electrons, rotor 72 rotates target 48 at a high rate of speed (e.g., 90 to 250 Hz) about a centerline 70. In addition to the rotation of anode target 48 within X-ray tube frame 46, in a CT application, the X-ray source 40 as a whole is caused to rotate within a gantry (not shown) about an object, such as object 16 of X-ray imaging system 10 in FIG. 1, at rates of typically 1 Hz or faster.

Figure 1A:
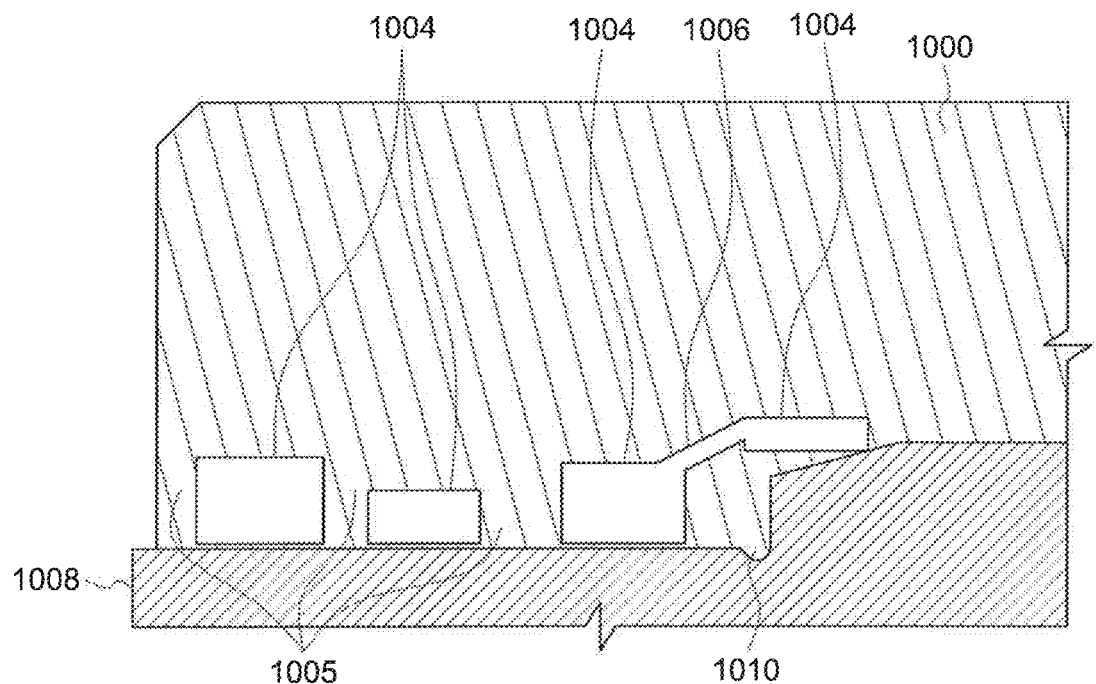
FIGS. 1A and 1B are cross-sectional views of portions of a prior bearing structure of an X-ray tube.
Figure 1B:
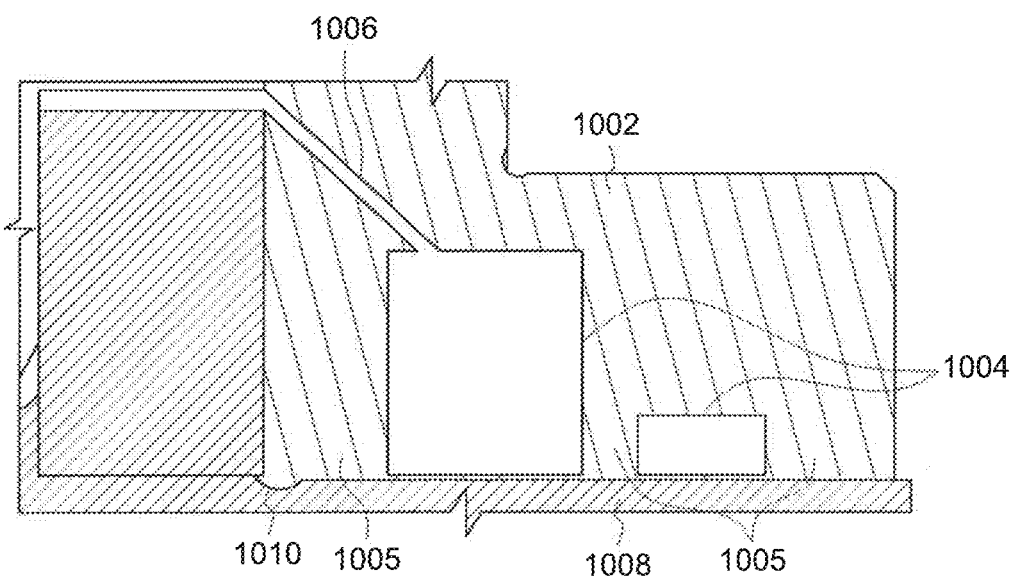

Bearing assembly 50 can be formed as necessary, such with a number of suitable ball bearings (not shown), but in the illustrated exemplary embodiment comprises a liquid lubricated or self-acting bearing, such as a liquid metal bearing, having adequate load-bearing capability and acceptable acoustic noise levels for operation within imaging system 10 of FIG. 1. As used herein, the terms "self-acting" and "self-lubricating" mean that the bearing lubricating fluid remains distributed on the surfaces of the bearing due to the relative motion of the bearing components and absent an external pump.

In general, bearing assembly 50 includes a stationary component, such as shaft 76, and a rotating component, such as sleeve 78 that surrounds the shaft 76 and to which the anode target 48 is attached. While shaft 76 is described with respect to FIG. 3 as the stationary portion of bearing assembly 50 and sleeve 78 is described as the rotating portion of bearing assembly 50, embodiments of the present invention are also applicable to embodiments wherein the shaft 76, the rotating component, rotates within a stationary sleeve 78, a stationary component. In such a configuration, anode target 48 would rotate as shaft 76 rotates.

Shaft 76 includes a cavity, bore or coolant flow path 80 through which a coolant 82 (FIG. 3), such as oil, flows to cool bearing assembly 50. As such, coolant 82 enables heat generated from anode target 48 of X-ray source 40 (FIG. 3) to be extracted therefrom and transferred external to X-ray source 40. In straddle mounted bearing assembly configurations, coolant flow path 80 extends along a longitudinal length of shaft 76. In alternative embodiments, bore 80 may extend through only a portion of shaft 76, such as in configurations where an X-ray source 40 is cantilevered when placed in an X-ray imaging system.

Figure 4:
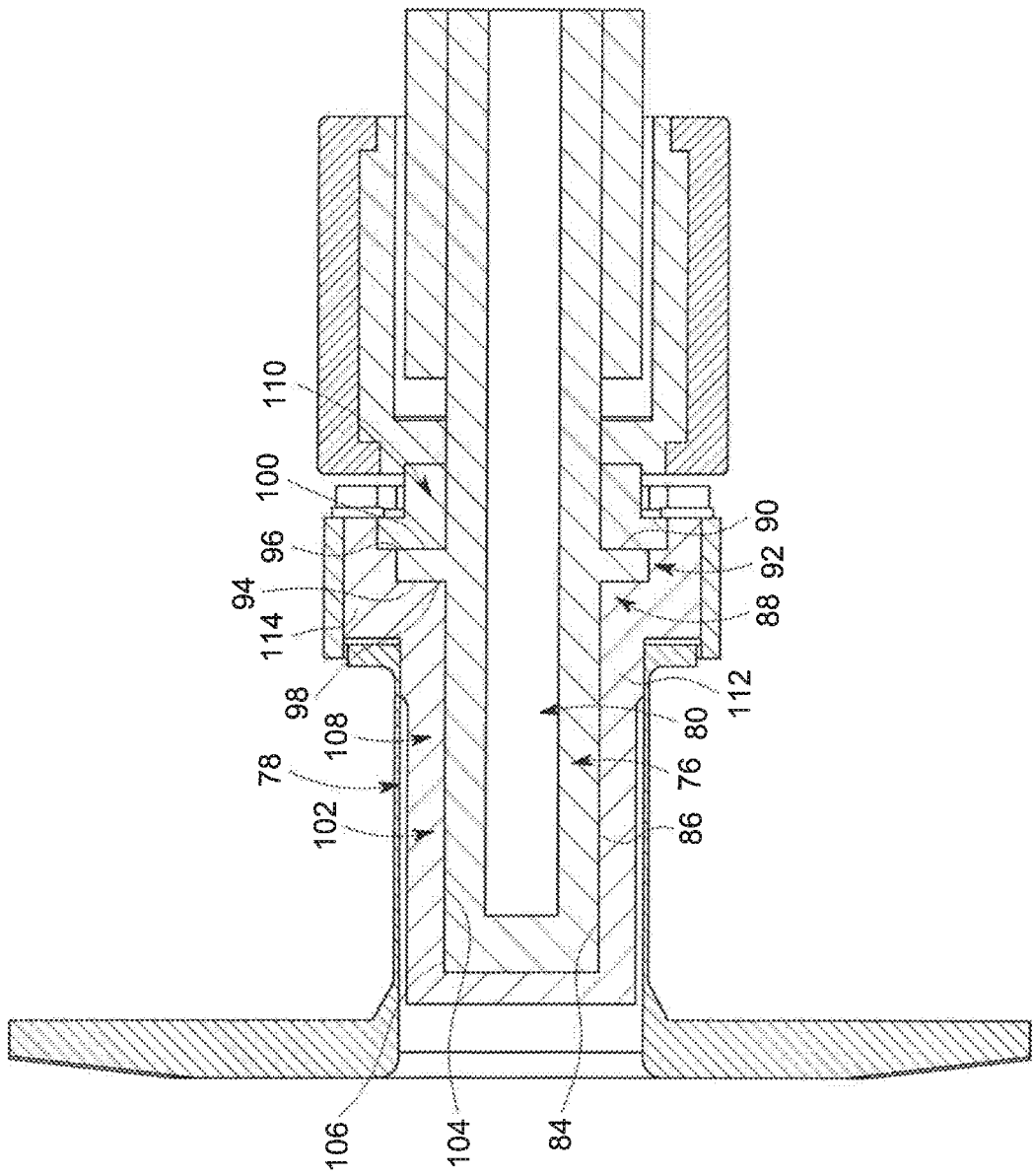
FIG. 4 is a cross-sectional side plan view of a bearing structure of an X-ray tube in accordance with an exemplary embodiment of the disclosure.
Figure 5:
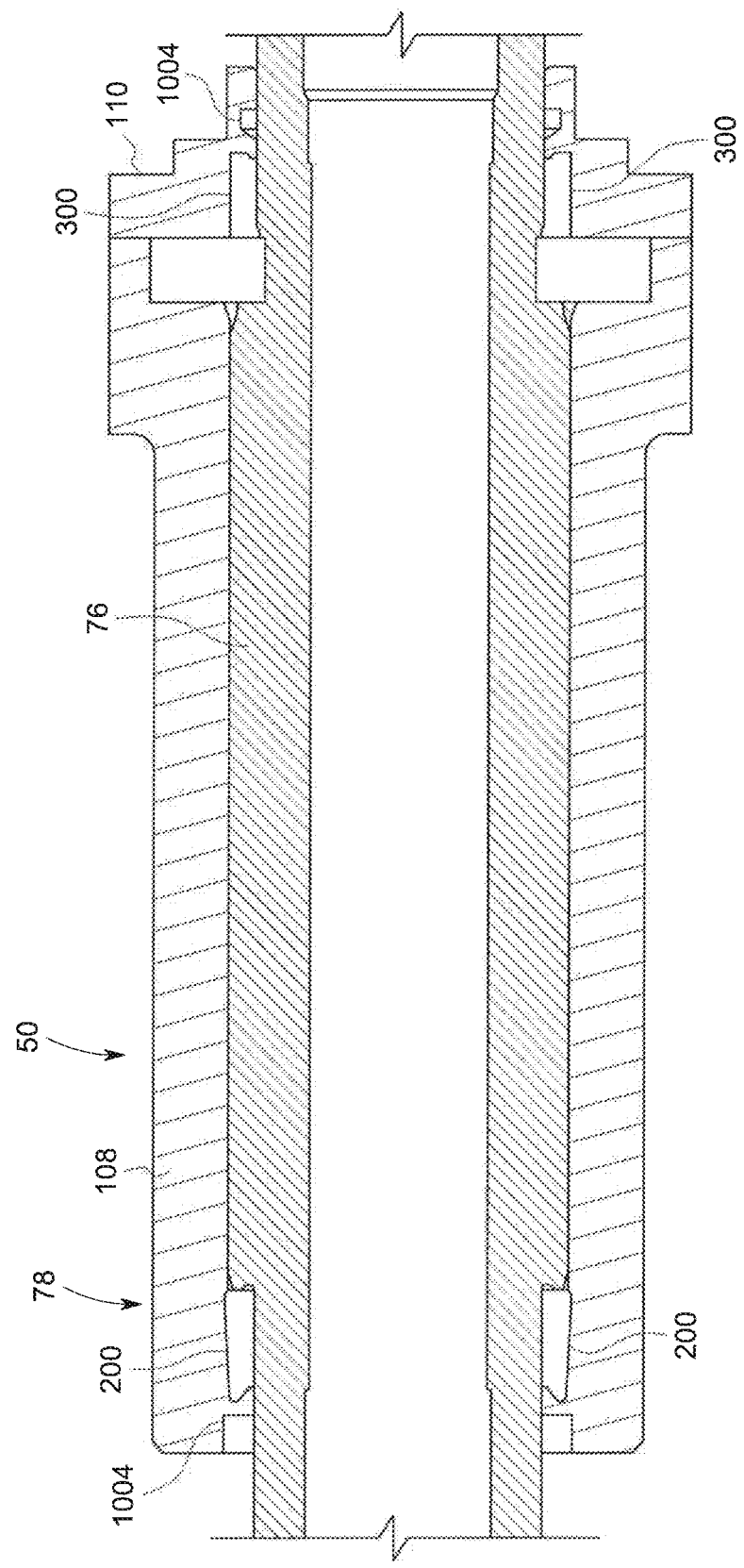
FIG. 5 is cross-sectional view of the bearing structure of FIG. 4 including enlarged bearing fluid traps formed in accordance with an exemplary embodiment of the disclosure.
Figure 6:
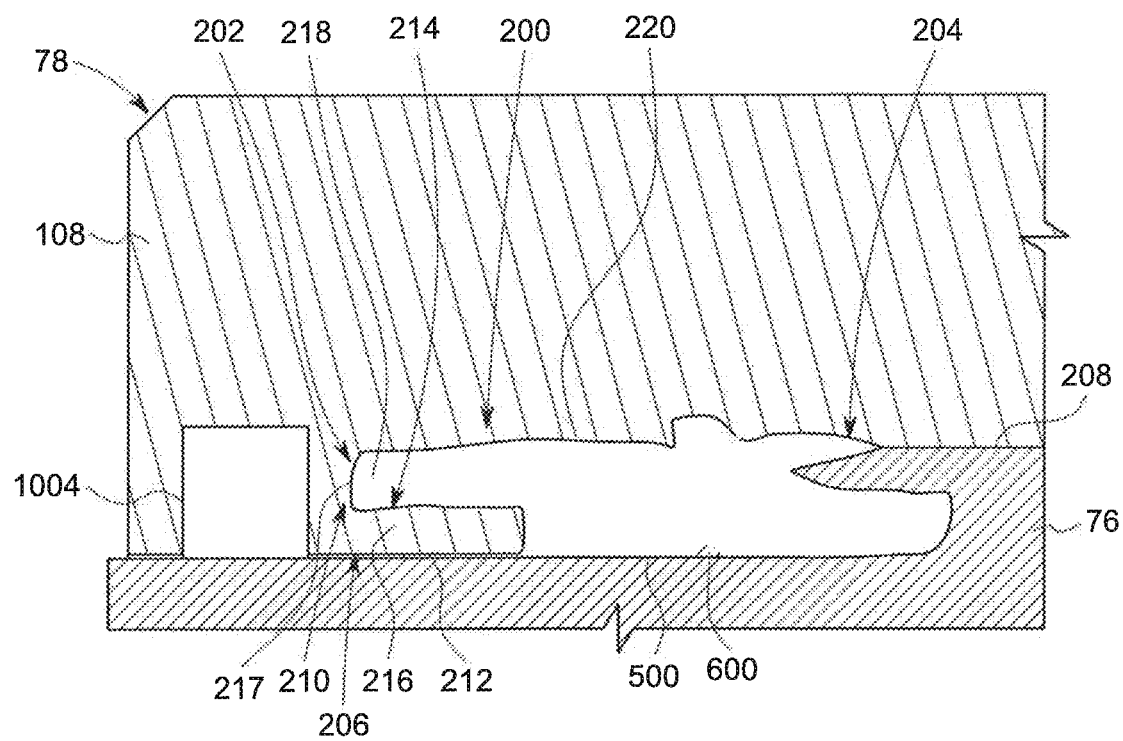
FIG. 6 is a sectioned cross-sectional view of a sleeve fluid trap formed in the bearing structure of FIG. 5 formed in accordance with another exemplary embodiment of the disclosure.

Referring now to FIG. 4, a cross-sectional view of a portion of bearing assembly or structure 50 is shown according to an embodiment of the invention. Bearing assembly 50 includes a shaft 76 positioned within sleeve 78, which is configured to support an anode target, such as anode target 48 of FIG. 2. A lubricating fluid 84 is positioned in a gap 208 formed between shaft 76 and sleeve 78. In embodiments of the invention, lubricating fluid 84 is a metal or metallic alloy that exists in a liquid state at operating temperature of bearing assembly 50.

The lubricating fluid 84 flowing between the rotating and stationary components of the bearing assembly 50 may include a variety of individual fluids as well as mixtures of fluids. For example, multiple liquid metals and liquid metal alloys may be used as the lubricating fluid, such as an indium gallium alloy. More generally, fluids with relatively low vapor pressures that are resistant to evaporation in vacuum-level pressures of the X-ray tube may be used. In the present context, low vapor pressures may generally be in the range of $1 \times 10^{-5}$ Torr. In other words, fluids that are stable in vacuums are desirable for use in X-ray tube systems so as to not adversely affect the established vacuum during operation of the system. In the present disclosure, lubricating fluid 84 may be gallium or a gallium alloy as non-limiting examples.

In the embodiment illustrated in FIG. 4, shaft 76 of bearing assembly 50 is a stationary component and sleeve 78 is a rotatable component constructed to rotate about shaft 76. However, one skilled in the art will recognize the inventive concepts described herein are applicable to alternative bearing configurations. As one example, bearing assembly 50 may instead include a stationary outer component or shell/sleeve and a rotating shaft comprising an anode target attached thereto. As another example, bearing assembly 50 may be a "straddle" bearing that is configured to support an anode target between a first and a second liquid metal bearing. In other words, embodiments of this invention may be incorporated into any bearing configuration utilizing a liquid metal bearing to support an anode target. Such configurations may include a stationary shaft and a rotatable outer sleeve, and vice versa. Further, one skilled in the art will recognize that such applications need not be limited to X-ray tubes, but may be applied to any structural configuration having a rotating component and a stationary component in a vacuum, the rotating component being supported within a liquid metal bearing assembly. Thus, the embodiments of the invention disclosed herein are applicable to any bearing configuration having a rotatable component and a stationary component, and a lubricating fluid therebetween, regardless of configuration or application.

As illustrated in FIG. 4, shaft 76 of bearing assembly 50 includes a thrust bearing 88 comprising a radial projection 90 that extends from shaft 76 and is positioned in a radial cavity 92 of sleeve 78. Radial projection 90 of thrust bearing 88 includes a pair of outer bearing surfaces 94, 96 that face inner bearing surfaces 98, 100 of radial cavity 92 of sleeve 78. Radial projection 90 limits axial motion of sleeve 78 relative to shaft 76, and, as illustrated, lubricating fluid 84 is also included between radial projection 90 and sleeve 78. Radial projection 90 need not be limited in axial length, but may be extended in axial length to provide additional mechanical support of components.

The shaft 76 also includes a journal bearing 102 located adjacent to and extending axially from thrust bearing 88. An outer surface 104 of journal bearing 102 of shaft 76 faces an inner surface 106 of sleeve 78. While journal bearing 102 is illustrated on a first side of thrust bearing 88 adjacent outer bearing surface 94, one skilled in the art will recognize that bearing assembly 50 may include a second journal bearing portion located on a second side of thrust bearing 88 adjacent outer bearing surface 96. Various coatings, textures, and patterns including grooves embedded in the contacting/bearing surfaces of bearing assembly 50 may be applied to alter bearing behavior as the shaft 76 and sleeve 78 rotate relative to each other.

In the exemplary embodiment illustrated in FIG. 4 the rotating component, e.g., sleeve 78 may be formed with a 2-piece construction including a sleeve portion 108 and a thrust seal 110, as well as a third component of a seal (not shown), if desired or necessary. The sleeve portion 108 is formed of a material that is low cost, with good machinability, good galling/wear characteristics, and good weldability. Further, while these materials do conduct heat, optionally a thermal barrier can be included between the bearing assembly 50 and the anode target 48 to maintain the temperatures in the bearing assembly 50 below the corrosion limits of the materials forming the bearing assembly 50. In an exemplary embodiment of the invention, the material forming the sleeve portion 108 may be a non-refractory metal, such as an iron alloy, including stainless steel, tool carbon steel, such as D2 steel, among others, though refractory materials and metals, such as molybdenum, can also be utilized. The sleeve portion 108 may be formed as a single piece of the selected material, with a closed cylindrical cap portion 112 at one end and an open seating portion 114 at the opposite end. In the illustrated exemplary embodiment, the seating portion 114 may be optionally integrally formed with the cap portion 112 to form a unitary structure for the sleeve portion 108 within which the shaft 76 and thrust seal 110 may be engaged, such as that disclosed in U.S. Patent Application Publication No. US2016/0133431, entitled Welded Spiral Groove Bearing Assembly, the entirety of which is expressly incorporated herein by reference. In an alternative exemplary embodiment of the bearing assembly 50, the sleeve 78 may be formed with a spacer (not shown) disposed between the sleeve portion 108 and the thrust seal 110, where the spacer is formed of a suitable material, such as a metal including steel, that includes grooves (not shown) and/or suitable anti-wetting coatings (not shown) applied to the surfaces of the spacer disposed immediately adjacent and in contact with the sleeve portion 108 and the thrust seal 110 to form seals therebetween.

Bearing assembly 50 may be referred to as a spiral groove bearing (SGB) due to the patterning of bearing grooves (not shown) along the various surfaces of the bearing assembly 50. The grooves may be formed in the bearing surfaces, such as on the exterior of the journal bearing 102, the interior surface of the sleeve portion 108, and on one or both outer bearing surfaces 94, 96 and inner bearing surfaces 98, 100 and can be separated by un-grooved areas (not shown). In some examples, the grooves may be formed from a chevron or a logarithmic spiral shape. The spiral groove bearing may also be equivalently referred to as a fluid dynamic or hydrodynamic bearing and liquid metal bearing as well.

In such spiral groove bearings, the lubricating fluids 84 are contained within the bearing structure to reduce leakage through the bearing utilizing anti-wetting properties of the surfaces where the surfaces are coated and/or textured to be anti-wetting such that the lubricating fluid 84 is pushed away from the small spaces or ends of the gap 208 near the ends of the bearing assembly 50. In this context, the gap 208 may be in the range of 15-150 microns, and it is desirable to enable the ends of the gap 208 remain relatively unobstructed by the lubricating fluid 84 by directing the lubricating or bearing fluid 84 away from the ends of the gap 208 to enable gases to escape through the ends of the gap 208 gap, thereby preventing pressures from building up within the bearing and urging the lubricating fluid 84 through the ends of the gap 208 and out of the bearing assembly 50.

Referring to FIGS. 5-11, in order to enhance the ability of the bearing assembly 50 to retain the lubricating fluid 84 within the gap 208, and any oxides thereof forming a portion of the lubricating fluid 84 that increase the wetting properties of the lubricating fluid 84 within the assembly 50, the rotating component(s) of the assembly 50, e.g., the sleeve 78 and the thrust seal 96, are each formed with an enlarged trap 200.

In FIGS. 5-8, an exemplary embodiment of the trap 200 formed in the sleeve/sleeve seal 78 is illustrated. The trap 200 forms a larger opening along the shaft 76 and has a number of geometric features that operate to more effectively retain and/or redirect the lubricating fluid 84 within the bearing assembly 50. The trap 200 defines a distal end 202 adjacent the end of the sleeve 76 opposite the thrust seal 96 and a proximal end 204 spaced interiorly of the distal end 202. The distal end 202 is disposed immediately adjacent a rotating anti-wetting seal 206 and the proximal end 204 of the trap 200 is disposed immediately adjacent the bearing fluid gap 208 defined between the shaft 76 and the sleeve 78. The distal end 202 of the trap 200 is formed with a redirecting member 210, which can be formed as an undercut or a volume or combination thereof, that has an optional radial surface or portion 212 that extends into the sleeve 78 in a radial direction away from the shaft 76 adjacent the seal 206. From the radial portion 212, the member 210 extends in at least one axial and/or radial direction into the sleeve 78 to form a volume 214, that in the illustrated exemplary embodiment has an angled surface 216 that terminates in a concave, curved end 217 forming a reservoir 218 within the distal end 202. In operation, lubricating fluid 84 that flows out of the gap 208 defined by the bearing assembly 50 travels along the shaft 76 and reaches the seal 206 adjacent the radial portion 212 of the distal end 202. Various anti-wetting attributes of the seal 206 and centrifugal forces acting on the fluid 84 direct the lubricating fluid 84 away from the seal 206 and onto the radial portion 212, when the lubricating fluid 84 is further directed along the radial portion 212 and into the volume 214.

Between the concave, curved end 217 of the member 210 formed at the distal end 202 and the proximal end 204 of the trap 200 is defined a fluid-directing surface 220 that can be flat, but as shown in the illustrated exemplary embodiment slopes radially outwardly from the distal end 202 towards the proximal end 204. This sloped surface 220 functions to direct any lubricating fluid 84 that enters the member 210 at the distal end 202 of the trap 200 along the sloped surface 220 and back toward the interior of the bearing assembly 50 using the centrifugal forces acting on the fluid 84 during operation of the X-ray tube 40. Further, the depth of the slope of the surface 220 and an associated member 210 adjacent the proximal end 204 is reduced from the undercut depth of prior art traps 1000 to closely correspond to the position of the gap 208 adjacent the proximal end 204 to facilitate the lubricating fluid being redirected into the gap 208 from the trap 200. Each of the surfaces of the radial portion 212, the volume 214 and the sloped surface 220 are wetted or wetting surfaces to enhance the ability of the lubricating fluid 84 to flow in the desired direction into the distal end 202 of the trap 200.

Figure 7:
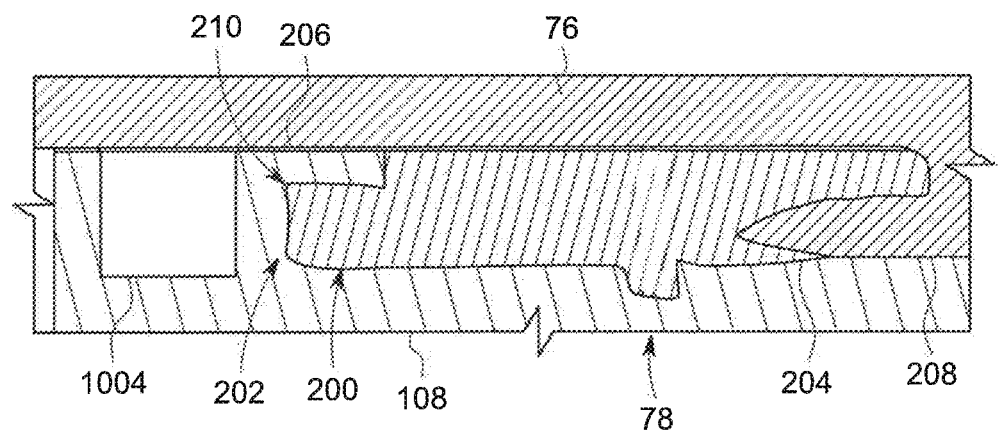
FIG. 7 is a cross-sectional view of the sleeve fluid trap illustrating maximum fill volume in horizontal bearing orientation in accordance with an exemplary embodiment of the disclosure.
Figure 8:
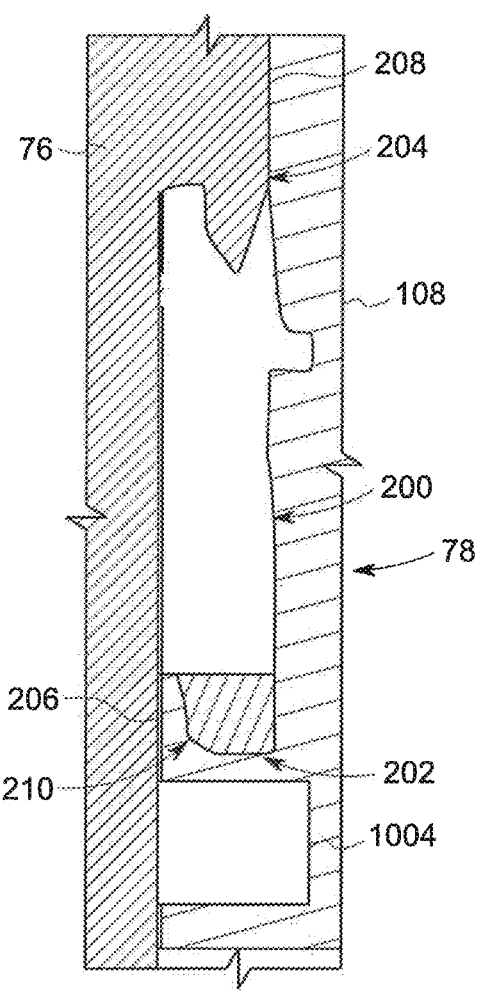
FIG. 8 is a cross-sectional view of the sleeve fluid trap illustrating maximum fill volume in vertical bearing orientation in accordance with an exemplary embodiment of the disclosure.

Looking now at FIGS. 7 and 8, the trap 200 is illustrated with the level of lubricating fluid 84 required in a horizontal orientation of the bearing assembly (FIG. 8) and a vertical orientation of the bearing assembly (FIG. 8) to fill the trap 200 to a level at which the lubricating fluid 84 comes into contact with the surfaces of the rotating seal 206. Due to the enlarged volume and geometry of the trap 200, in the horizontal orientation of FIG. 6 the entire trap 200 must be filled with lubricating fluid 84 prior to the fluid 84 directly contacting the rotating seal 206. In the vertical orientation, the entire volume 214 of the undercut 210 must be filled prior to the lubricating fluid 84 contacting the rotating seal 206. In either orientation, the trap 200 prevents a greater amount of lubricating fluid 84 from reaching the seal 206 than was possible in prior art trap configurations.

Looking now at FIGS. 5 and 9-11, the thrust seal 110 includes a trap 300 formed therein having a configuration similar to that of trap 200. The trap 300 includes a proximal end 304 adjacent the thrust bearing 88 and a distal end 302 spaced from the thrust bearing 88. The distal end 302 of the trap 300 is formed with a redirecting member 310 that can be formed as an undercut or a volume, and has a radial portion 312 that extends into the thrust seal 110 in a radial direction away from the shaft 76 adjacent the rotating seal 206. From the radial portion 312, the member 310 extends axially and radially into the sleeve 78 to form a volume 314 having an angled surface 316 that terminates in a rounded reservoir 318 for the distal end 302.

The member 310 formed at the distal end 302 and the proximal end 304 of the trap 300 define a surface 320 extending therebetween that slopes radially outwardly from the distal end 302 towards the proximal end 304. This sloped surface 320 functions to direct any lubricating fluid 84 that enters the distal end 302 of the trap 300 along the sloped surface 320 back toward the interior of the bearing assembly 50 using the centrifugal forces acting on the fluid 84 during operation of the X-ray tube 40.

Figure 9:
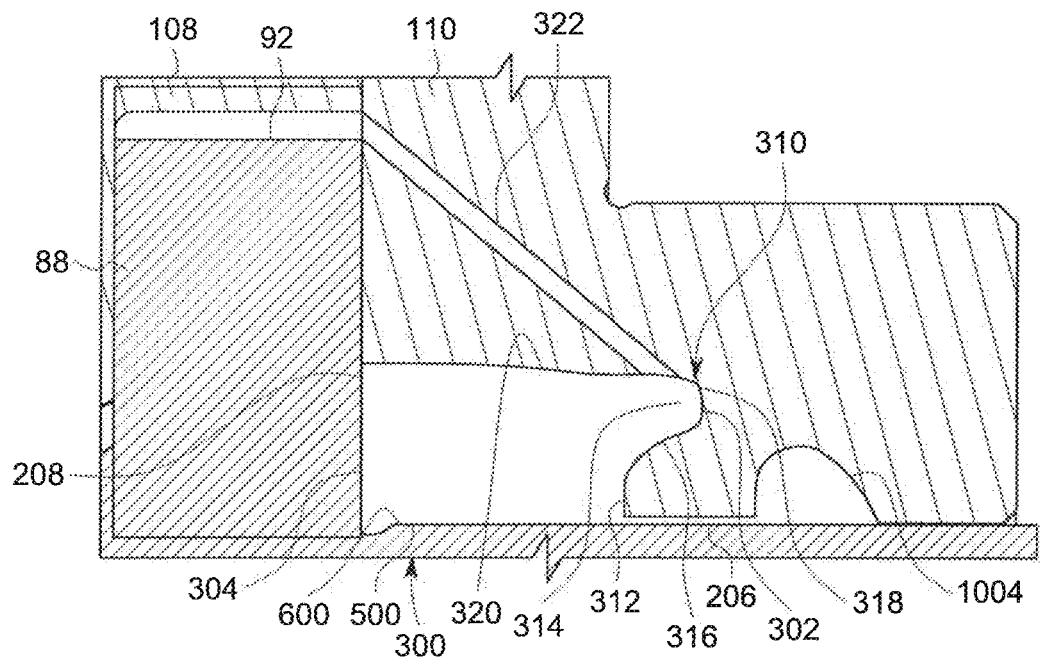
FIG. 9 is a sectioned cross-sectional view of a thrust bearing fluid trap formed in the bearing structure of FIG. 5 in accordance with another exemplary embodiment of the disclosure.

In addition, as shown in FIG. 9, the trap 300 can include a channel 322 the is formed in the thrust seal 110 to extend from approximately the distal end 302 of the trap 300 to the radial cavity 92 formed around the thrust bearing 88. When present, the channel 322 assist in redirecting lubricating fluid 84 from within the trap 300 back to within the bearing assembly 50 via the radial cavity 92. To assist this function, each of the surfaces of the volume 314 and the sloped surface 320, as well as the channel 322, if present, are wetted or wetting surfaces to enhance the ability of the lubricating fluid 84 to flow in the desired direction into the distal end 302 of the trap 300.

Figure 10:
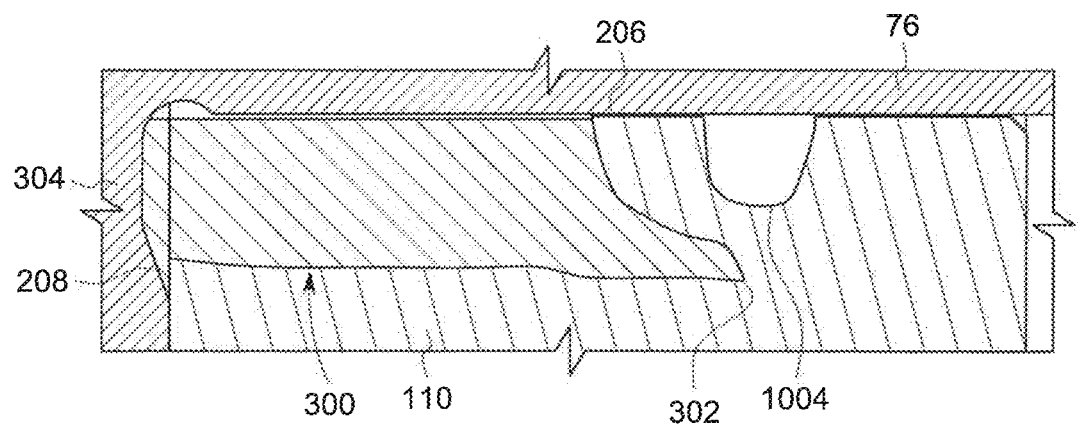
FIG. 10 is a cross-sectional view of the thrust bearing fluid trap illustrating maximum fill volume in horizontal bearing orientation in accordance with an exemplary embodiment of the disclosure.
Figure 11:
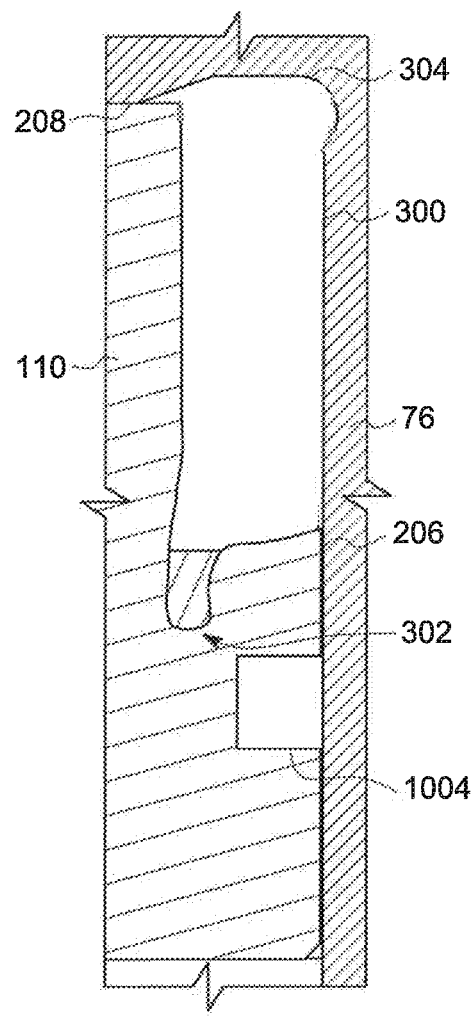
FIG. 11 is a cross-sectional view of the thrust bearing fluid trap illustrating maximum fill volume in vertical bearing orientation in accordance with an exemplary embodiment of the disclosure.

Looking now at FIGS. 10 and 11, similar to the trap 200, the trap 300 is illustrated with the level of lubricating fluid 84 required in a horizontal orientation of the bearing assembly (FIG. 10) and a vertical orientation of the bearing assembly (FIG. 11) to fill the trap 300 to a level at which the lubricating fluid 84 comes into contact with the surfaces of the rotating seal 206. Due to the enlarged volume and geometry of the trap 300, in the horizontal orientation of FIG. 7 the entire trap 300 must be filled with lubricating fluid 84 prior to the fluid 84 directly contacting the rotating seal 206. In the vertical orientation, the entire volume 314 of the undercut 310 must be filled prior to the lubricating fluid 84 contacting the rotating seal 206. In either orientation, the trap 300 prevents a greater amount of lubricating fluid 84 from reaching the seal 206 than was possible in prior art trap configurations.

Figure 12:
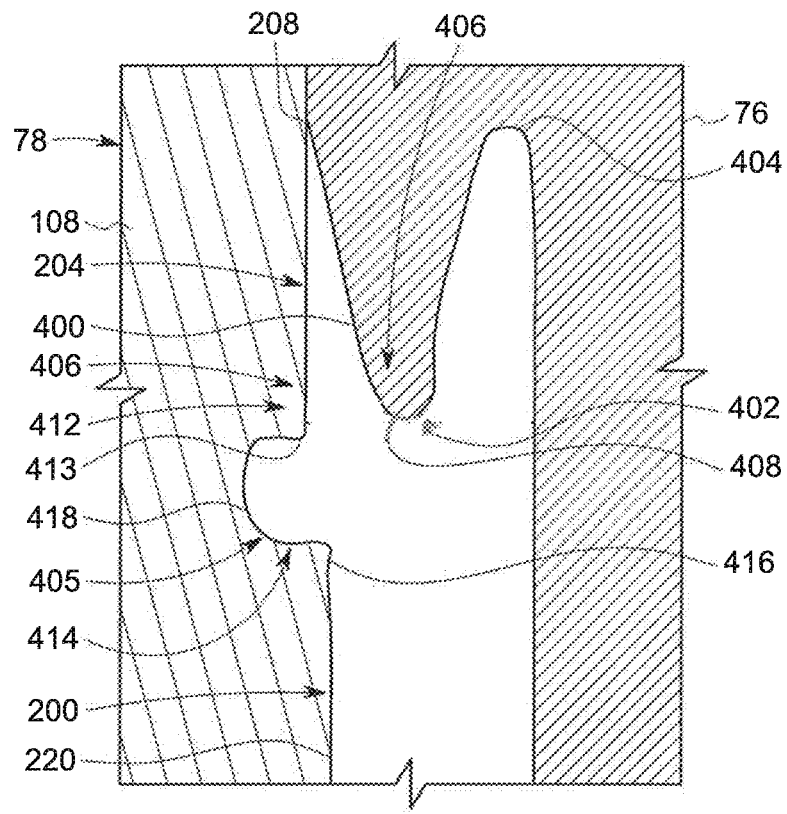
FIG. 12 is a sectioned cross-sectional view of the sleeve fluid trap of FIG. 5 including fluid pinning structures formed in accordance with further exemplary embodiments of the disclosure.

Referring now to FIG. 12, in addition to the orientations and/or features of the surfaces of the trap 200 that operate to restrict and redirect the flow of lubricating fluid 84 towards the rotating seal 206, the trap 200 and the shaft 76 can include geometric features to perform this function. In the illustrated exemplary embodiment, of FIG. 12, the shaft 76 includes a radially inwardly tapering surface 400 extending into the trap 200 from the gap 208. The surface 400 terminates in a convex, rounded tip 402 that extends into a concave drip guiding member 404, e.g., and undercut or volume, opposite the surface 400. The position of the rounded tip 402 functions as a fluid pinning feature 406, where the shape of the tip 402 causes any lubricating fluid 84 flowing along the surface 400 to create droplets at the apex 408 of the tip 402, and to prevent the fluid 84 from flowing inwardly from the end 402 into the member 404 and along the shaft 76 towards the seal 206. This function for the pinning feature 406 to hinder the flow of the lubricating fluid 84 along the shaft 76 can be enhanced by the application of an anti-wetting coating 600 on the portion of the rounded tip 402 between the apex 408 and the member 404, as well as through the member 404 and optionally along the shaft 76. As the droplets form at the apex 408 of the rounded tip 402, they are released upon reaching a sufficient mass to pull away from the tip 408 and drop into the member 210 of the trap 200. From the member 210, the droplets of the lubricating fluid 84 are directed away from the seal 206 and back into the gap 208, as described previously.

In addition to the pinning feature 406 on the shaft 76, the trap 200 can include pinning features 406. As shown in FIG. 12, the sloped surface 220 can include fluid pinning features 406 thereon to provide fluid impedance functions similar to the rounded end 402. In particular, the fluid pinning features 406 on the surface 220 can include a first surface feature 412 disposed at the end of the undercut 210 adjacent the gap 208 and a second surface feature 414 spaced from the first feature 412 towards the member 210, where the first surface feature 412 and the second surface feature 414 in an exemplary embodiment are formed as discontinuities in the surface containing the surface feature. In the illustrated exemplary embodiment, the first feature 412 is formed as a shoulder or change in slope 413 of the surface 220, while the second feature 414 is formed as a corner or lip 416 of a radially-extending recess 418 formed in the surface 220. In each case, the first feature 412 and second feature 414 operate to create fluid surface tension/meniscus or fluid pinning forces on the lubricating fluid 84 flowing out of the gap 208 to impede the flow of the fluid 84 towards the seal 206.

Referring now to the exemplary illustrated embodiments of FIGS. 13-17, in addition to the structural or geometric features of the trap 200,300, the sleeve 78, thrust seal 110, sleeve portion 108 and/or the shaft 76 that are utilized to impede the flow of lubricating fluid 84 to the seals 206 and to redirect and fluid 84 away from the seals 206, the bearing assembly 50 includes one or more surface variations formed or disposed on various surfaces of the bearing assembly 50, where the surface variations include one or both of surface texturing features 500 and anti-wetting coatings 600, to enhance this functionality of the bearing assembly 50.

Figure 13:
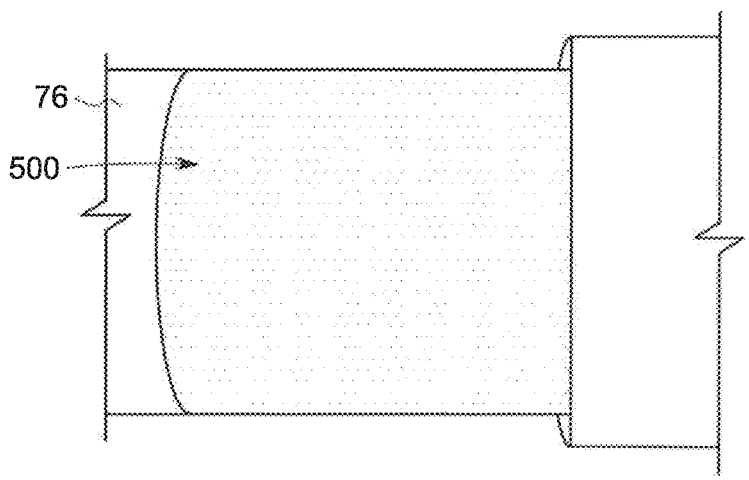
FIG. 13 is a partially broken away isometric view of a shaft of the bearing structure of FIG. 5 formed with an anti-wetting textured surface in accordance with further exemplary embodiments of the disclosure.
Figure 14:
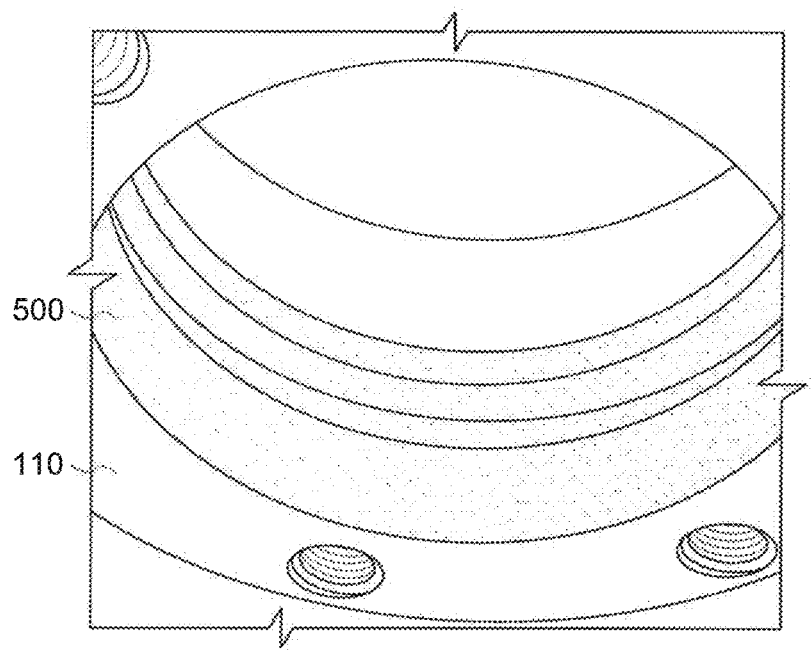
FIG. 14 is a partially broken away isometric view of a thrust bearing of the bearing structure of FIG. 5 formed with an anti-wetting textured surface in accordance with further exemplary embodiments of the disclosure.

As shown in the exemplary illustrated embodiments of FIGS. 13 and 14, the surface variations in the form of surface texturing features 500 can be applied to various surfaces of the bearing assembly 50, and in particular to one or more surfaces on the shaft 76, the sleeve 78 and the thrust bearing 96. The surface texturing features 500 can be formed on the components of the bearing assembly 50 in any suitable manner, such as those disclosed in U.S. Pat. No. 9,500,226, entitled Method And Systems For Texturing Liquid Bearing Surfaces In X-Ray Tubes, the entirety of which is expressly incorporated herein by reference for all purposes. The features 500 are formed or disposed on the shaft 76 adjacent the trap 200 within the member 404, onto the tip 402, and along the exterior of the shaft 76 adjacent the traps 200 and 300 extending towards and through the respective seals 206, as shown in FIG. 13. The features 500 can additionally be formed on axial and/or radial surfaces of the shaft 76 and/or the sleeve 78, e.g., the sleeve portion 108 and thrust seal 110, leading up to and/or forming portions of the seals 206, as well as on the surfaces of secondary traps 250,350 (FIGS. 6 and 9) located adjacent traps 200,300, as shown in FIG. 14.

The surface texturing features 500 provide areas of the components of the bearing assembly 50 that have a significantly reduced surface area available for the lubricating fluid 84 to adhere to and on which to spread outwardly, which in one exemplary embodiment are areas having protrusions 502 of less than one micrometer (1 μm) in height to significantly reduce the ability of the lubricating fluid 84 to adhere to the surface texturing features 500. As such, the surface texturing features 500 function as highly effective anti-wetting surfaces for the bearing assembly 50.

Figure 15:
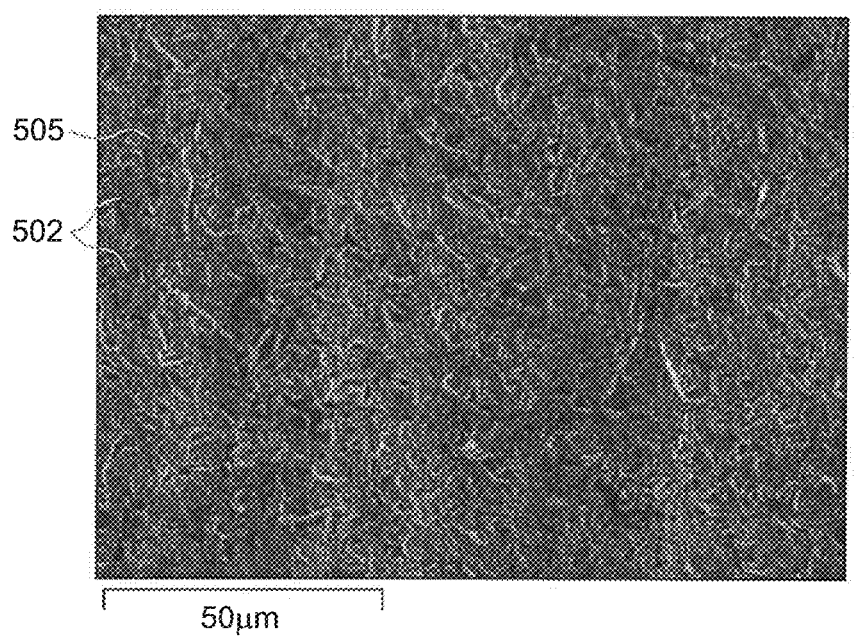
FIG. 15 is a 1000× magnified top plan view of a media blasted anti-wetting surface of the bearing structure of FIG. 5.

To form the surface texturing features 500, in certain exemplary embodiments the processes of suitable media blasting, such as abrasive particle blasting, which employs abrasive particles or material to texture surfaces, including, but not limited to grit blasting, sandblasting, or any other abrasive particle or material blasting, chemical etching, electro-chemical texturing or etching, or laser etching or texturing, and combinations thereof, can be utilized. Referring to FIG. 15, a magnified image of media-blasted surface 505 are illustrated showing the topographical structure of the surface 505 forming the texturing features 500 with the required reduced surface area available for contact with the lubricating fluid 84.

Figure 16:
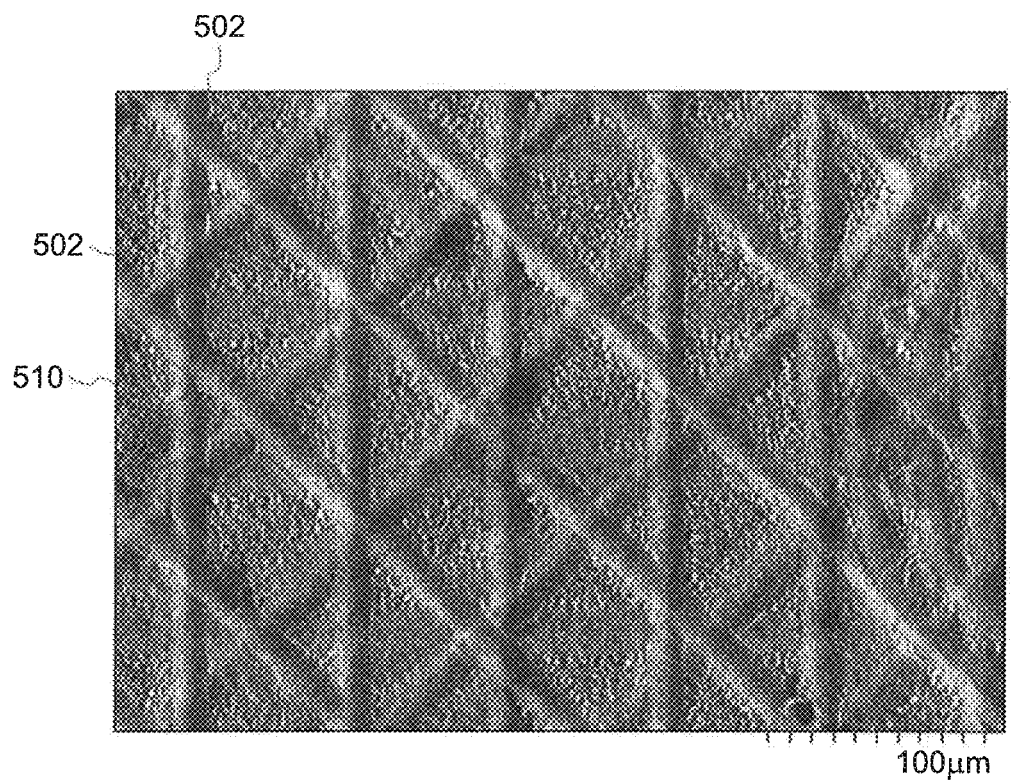
FIG. 16 is a 300× magnified top plan view of a laser etched anti-wetting surface of the bearing structure of FIG. 5.
Figure 17:
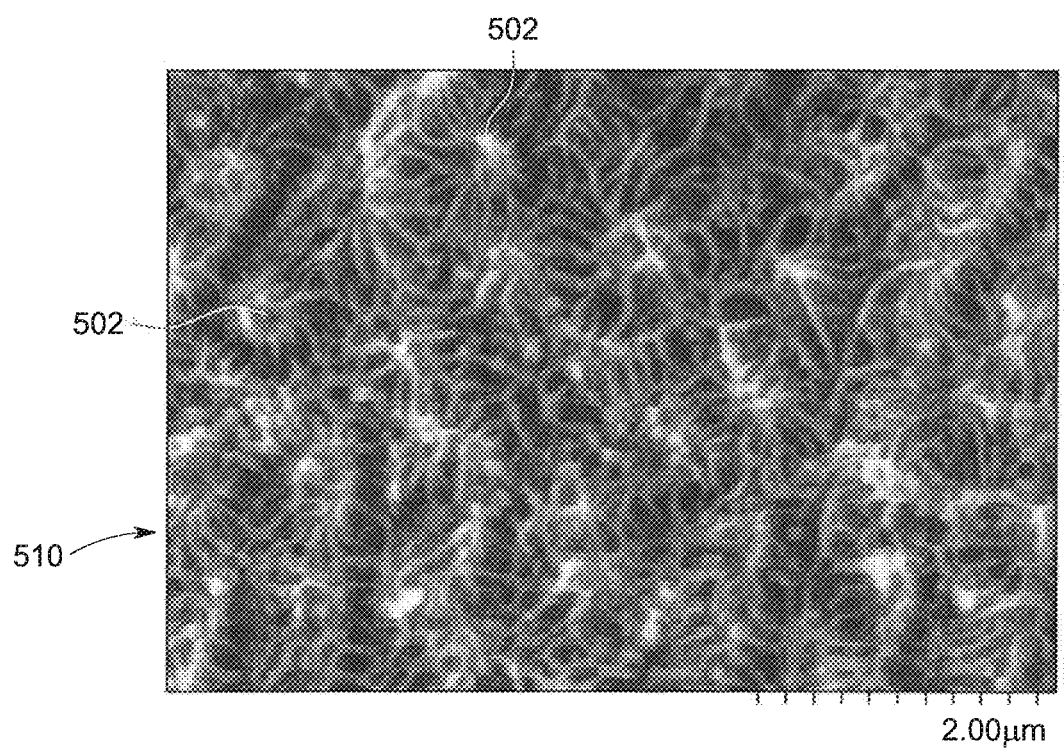
FIG. 17 is a 20000× magnified top plan view of a laser etched anti-wetting surface of the bearing structure of FIG. 5.

In FIGS. 16 and 17, the macroscopic (FIG. 16) and microscopic (FIG. 17) laser etched surfaces 510 are illustrated showing the topographical structure of the surfaces 510 including the protrusions 502 forming the texturing features 500 with the required reduced surface area available for contact with the lubricating fluid 84.

Further, with regard to other exemplary embodiments either including or omitting surface variations in the form of the surface texturing features 500, the surfaces of the rotating component and/or stationary component, e.g., sleeve 78 and/or shaft 76, on which the surface texturing features 500 can be placed can additionally or exclusively have surface variations thereon in the form of anti-wetting coatings 600 disposed on the surfaces. The coatings 600 can have any suitable composition and can be applied in any suitable manner to enhance the lubricating fluid impeding and redirecting functions of the traps 200,300 and the fluid pinning features 406. In one exemplary embodiment, as the surface texturing features 500 are more effective in providing the anti-wetting properties at lower temperatures, the coating 600 is selected to provide effective anti-wetting properties at high temperatures. Thus, in one exemplary embodiment the coating 600 is formed of titanium nitride (TiN) which has highly effective anti-wetting properties at high temperatures.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bearing assembly for an X-ray tube, the bearing assembly comprising:
    a shaft;
    a sleeve disposed around the shaft, wherein one of the shaft and the sleeve is rotatable with regard to the other to form a rotating component and a stationary component;
    a lubricating fluid disposed between the shaft and the sleeve within a gap disposed between the sleeve and the shaft; and
    at least one fluid trap formed in the rotating component, the at least one fluid trap having a proximal end in fluid communication with the gap, a distal end spaced from the gap and disposed adjacent a rotating seal formed between the sleeve and the shaft, and a fluid-directing surface extending between the distal end and the proximal end, wherein the distal end includes a reservoir formed by a curved surface.

2. The bearing assembly of claim 1, wherein the fluid-directing surface extends in an outward radial direction from the distal end to the proximal end.

3. The bearing assembly of claim 1, further comprising a member formed at the distal end of the trap.

4. The bearing assembly of claim 3, wherein the member comprises:
    a radial portion disposed adjacent the seal and extending into the sleeve; and
    a volume formed between the radial portion and the fluid-directing surface.

5. The bearing assembly of claim 4, wherein the volume comprises a surface extending from the radial portion opposite the seal in a direction away from the proximal portion.

6. The bearing assembly of claim 1, further comprising at least one fluid pinning feature formed on at least one of the fluid-directing surface, the shaft, or combinations thereof.

7. The bearing assembly of claim 6, wherein the at least one fluid pinning feature is a surface discontinuity formed on the fluid-directing surface.

8. The bearing assembly of claim 6, wherein the at least one fluid pinning feature is formed as a surface discontinuity on the shaft adjacent the gap.

9. The bearing assembly of claim 8, further comprising a drip guiding member formed on the shaft adjacent the surface discontinuity opposite the gap.

10. The bearing assembly of claim 9, further comprising surface variation disposed on the drip guiding member.

11. The bearing assembly of claim 1, further comprising at least one surface variation formed on the rotating component, the stationary component, or combinations thereof.

12. The bearing assembly of claim 11, wherein the at least one surface variation is at least one surface texturing feature selected from a media-blasted surface texturing feature, a chemical-etched surface texturing feature, a laser-etched surface texturing feature, an electro-chemical texturing feature, an electro-chemical etched feature, and combinations thereof.

13. The bearing assembly of claim 12, wherein the at least one surface variation is formed on a radial surface of the rotating component adjacent a rotating seal, on a radial surface of the non-rotating component adjacent a rotating seal, or combinations thereof.

14. The bearing assembly of claim 12, wherein the at least one surface texturing feature comprises surface projections of heights of less than 1um.

15. The bearing assembly of claim 11, wherein at least one surface variation is an anti-wetting coating disposed on the rotating component, the stationary component, or combinations thereof.

16. The bearing assembly of claim 1, further comprising at least one surface texturing feature disposed on at least one of the sleeve, the shaft or combinations thereof.

17. An X-ray tube comprising:
a cathode assembly; and
an anode assembly spaced from the cathode assembly, wherein the anode assembly comprises:
a shaft;
a sleeve disposed on the shaft, wherein one of the shaft and the sleeve is rotatable with regard to the other to form a rotating component and a stationary component;
a lubricating fluid disposed between the shaft and the sleeve within a gap disposed between the sleeve and the shaft; and
at least one fluid trap formed in the sleeve, the at least one fluid trap having a proximal end in fluid communication with the gap, a distal end spaced from the gap and disposed adjacent a rotating seal formed between the sleeve and the shaft, and a fluid-guiding surface extending between the distal end and the proximal end, wherein the distal end includes a reservoir formed by a curved surface.

18. The X-ray tube of claim 17, wherein the fluid-guiding surface extends in an outward radial direction from the distal end to the proximal end.

19. The X-ray tube of claim 17, further comprising a fluid redirecting member formed at the distal end of the trap.

20. The X-ray tube of claim 17, further comprising at least one fluid pinning feature formed on at least one of the fluid-guiding surface, the shaft, or combinations thereof.

* * * * *